United States Patent [19]

Kreft

[11] Patent Number: 4,602,253

[45] Date of Patent: Jul. 22, 1986

[54] APPARATUS FOR MUTUAL INFORMATION TRANSMISSION IN A LOCK AND KEY SYSTEM

[75] Inventor: Hans-Dietrich Kreft, Reinbeck, Fed. Rep. of Germany

[73] Assignee: Angewandte Digital Elektronik GmbH, Fed. Rep. of Germany

[21] Appl. No.: 695,347

[22] Filed: Jan. 28, 1985

[30] Foreign Application Priority Data

Jan. 27, 1984 [DE] Fed. Rep. of Germany ....... 3402737

[51] Int. Cl.[4] ................................................ G06F 7/04

[52] U.S. Cl. .......................... 340/825.31; 340/825.34; 340/825.69; 340/825.72; 343/6.8 R; 361/172

[58] Field of Search ...................... 340/825.69, 825.31, 340/825.34, 825.54, 825.72, 572, 551; 70/277, 278; 343/6.8 R, 6.8 LC; 361/172; 179/82

[56] References Cited

U.S. PATENT DOCUMENTS

| | | | |
|---|---|---|---|
| 2,927,321 | 3/1960 | Harris | 343/6.8 R X |
| 3,299,424 | 1/1967 | Vinding | 343/6.8 R X |
| 3,440,633 | 4/1969 | Vinding | 340/258 |
| 3,714,419 | 1/1973 | Fosse et al. | 246/63 |
| 3,721,830 | 3/1973 | Oishi et al. | 307/3 |
| 3,859,624 | 1/1975 | Kriofsky et al. | 343/6.8 R X |
| 4,114,151 | 9/1978 | Denne et al. | 343/6.8 LC |
| 4,328,482 | 5/1982 | Belcher et al. | 340/310 |
| 4,333,072 | 6/1982 | Beigel | 340/572 X |
| 4,371,867 | 2/1983 | Gander | 340/310 |
| 4,388,524 | 6/1983 | Walton | 235/380 |
| 4,473,825 | 9/1984 | Walton | 340/825.34 X |

OTHER PUBLICATIONS

Co-Pending Kreft U.S. patent application Ser. No. 481,385, filed Apr. 1, 1983, now U.S. Pat. No. 4,549,176.

*Primary Examiner*—Ulysses Weldon

*Attorney, Agent, or Firm*—Hill, Van Santen, Steadman & Simpson

[57] ABSTRACT

An apparatus for mutual information transmission between an electronic lock and a key uses antenna coils at both the key and lock. A periodic signal is emitted from the lock and is received by the key upon activation of a key electronics and emission of a coded information signal. This returned signal received from the lock coil is briefly short-circuited or damped at the key side in order to produce a synchronization switch synchronizing the points in time of the signal appearance. Electronic converters are provided which, given the precondition that the short-circuit signal extends over a plurality of signal pulses, generate a digital signal corresponding to the short-circuit times.

6 Claims, 4 Drawing Figures

APPARATUS FOR MUTUAL INFORMATION TRANSMISSION IN A LOCK AND KEY SYSTEM

BACKGROUND OF THE INVENTION

1. Field of the Invention

The present invention relates to a lock and key system and more particularly to an electronic lock and key system in which electronic signal information may be transmitted between the lock and key parts.

2. Description of the Prior Art

Lock and key systems are utilized wherein antenna coils are provided at the lock side and at the key side for purposes of non-contacting, energetic coupling connections. The antenna coil at the lock side is supplied by a generator with a periodic signal which is transmitted to and received by the coil at the key side. This activates electronics in the key and causes the key electronics to emit a coded information signal which is received and evaluated by electronics at the lock side. The purpose of this signal is to produce a synchronization switch which synchronizes the points and times of the signal appearance. A short-circuit, a brief-duration dampening or dampening reduction of the antenna coil is undertaken at the key side, so that a modified signal curve occurs at both coils at points in time that are defined by a coincidence of counter events.

In the application and use of such an apparatus, a number of difficulties and problems occur on the lock side. For example, the damped signal curve of the coil at the lock side occurring as a consequence of, for example, a short-circuit of the coil at the key side must be recognized. To provide this recognition, it is known to provide a second coil on the lock side at the same generator, but spatially separated from the first coil. The signals of the two coils are then compared to one another, so that an electronic comparator circuit only supplies a signal when the damped signals appear at the first coil. The damped signals do not appear at the second coil due to the spatial separation therefrom. Since, however, an inductively coupled load, that is from the key coil, is present at the first lock coil, the signal curves of the two coils at the lock side have a differing phase position. This differing phase position can be compensated at the two coils on the lock side by means of a suitable combination of resistors, so that the voltage curves at both coils are completely identical except during the damping time.

However, both the resistors as well as the coils are subject to high temperature dependency. In the extreme case, during high temperature conditions, the recognition of the reception signals is prevented. Also, the construction of a second lock coil raises problems due to limited space in the lock structure and also adds expense to the lock. Further, the generator must produce a higher power due to a second coil at the lock side depending on the same generator, and thus the generator is bulkier. Overall, the temperature also rises due to the higher power conversion, this having the disadvantageous qualities described above with respect to temperature dependency.

The required balancing of the phase compensating resistors is a time-intensive, difficult and, thus an expensive factor in the production phase. Also, if various parts such as coils or resistors are replaced, the entire apparatus must be readjusted.

SUMMARY OF THE INVENTION

An object of the present invention is to eliminate the costs and disadvantages connected with the tuning resistors and with the additional coil provided in known lock/key systems and to be able to offer a circuit which, provided with inexpensive, commercially available components that are simple to test, particularly enables the short circuits at the key coil. A further object of the present invention is to generate a signal at the lock side which only appears during the time the coil at the lock side is damped by the coil at the key side.

In terms of its basic features, the invention provides that the signal picked up by the lock part is forwarded onto two guide branches which are connected to two sides of a first comparator, one branch comprising a signal tapped by means of a permanently set voltage divider and the other branch comprising a rectified signal which sets a threshold relative to the signal pending at the first, negative input, whereby a positive signal appears at the output of the comparator only when the level of the rectified signal at the positive input lies above the signal at the negative input. The signal from the lock coil is conducted to a second comparator and the output signal from the second comparator as well as the output signal from the first comparator are applied to two flip-flop devices which are combined in such fashion that an output signal is supplied only when a dampening of the lock coil has existed over a plurality of half-waves.

A second embodiment of the invention provides that the voltage supplied to the first comparator is generated by means of a digital to analog converter in conjunction with a control electronics at precisely a level in the region between the short-circuit peaks and the maximum peaks of the signals at the negative input of the first comparator and is applied to the second positive input of the first comparator so that the first comparator supplies unequivocal output signals for the short-circuit when the short-circuit signals appear at the first negative input.

DESCRIPTION OF THE PREFERRED EMBODIMENTS

Figure 1:
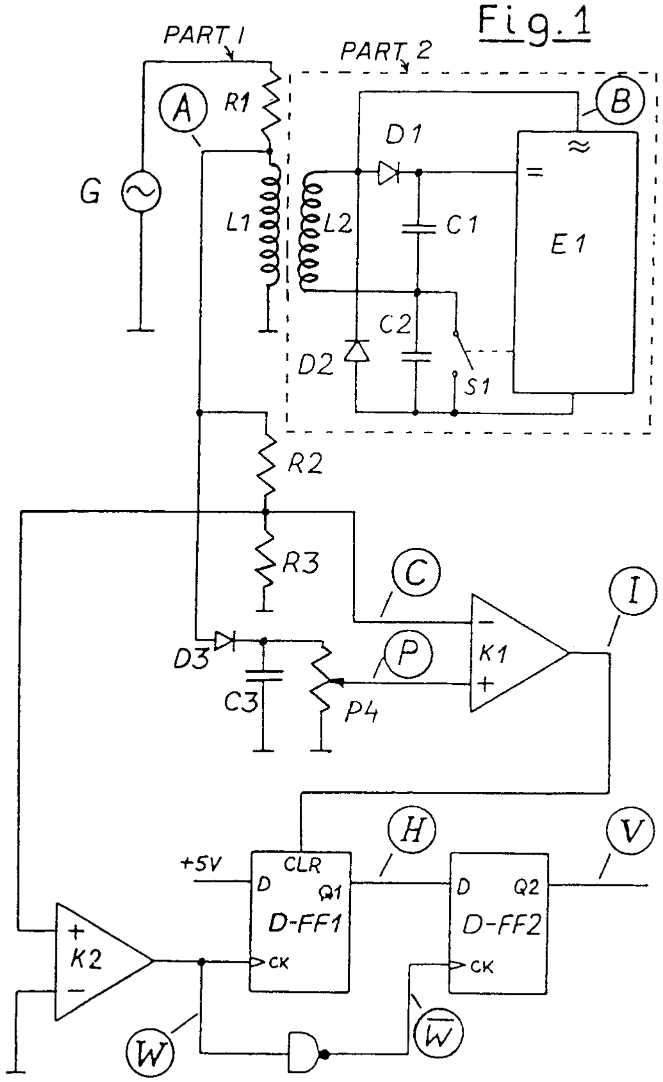
FIG. 1 is an electrical schematic diagram of a circuit embodying the principles of the present invention.

In FIG. 1, part 1 indicates a lock part and part 2 represents the key part in a lock key system. The lock part 1 includes a generator G which generates a radiofrequency signal which is conducted via a resistor R1 and an antenna coil L1. Provided at the side of the key part 2 is an antenna coil L2 coupled to the lock coil L1 which, with the assistance of the diodes D1, D2 and capacitors C1, C2, represents a rectifier circuit which supplies the electronics E1 with a d.c. voltage.

The electronics E1 serves the purpose of interrogating and counting the positive half-waves of the key circuit via point B. The electronics E1 contains a coding with which a determination is made as to when the switch S1 is shortcircuited. Of the two signal curves, that of the lock circuit is now no longer determinant, but that of the key circuit is. At a specific point in time (after n positive half-waves of the signal), a short-circuit ensues and can be documented at A delayed by Δt. With this principle, the signals which have appeared at the key side are documentable with complete synchronization at A and can thus be recognized.

Due to the existing coupling of the coils L1 and L2, when the key part 2 is placed in close association with the lock part 1, it follows that, upon a short-circuit of the coil L2, a modified signal curve occurs not only at L2 but also at the coil L1 of the lock circuit. A corresponding effect can also be produced in that a signal boost by means of supplying energy to the coil L2 instead of a signal reduction by means of a more or less complete short-circuit. This signal boost would also be transmitted to coil L1 and would be able to produce synchronization times. Any occurance which would cause a change in the impedance of the coil L2 will result in a detectable modified signal curve at coil L1. The impedance of coil L1 when coupled with coil L2 is the sum of the isolated impedance of coil L1 plus the inverse of the impedance of coil L2 multiplied by a coupling factor.

The voltage signal present at point A on the lock part 1 is transmitted through a voltage divider comprised of resistors R2 and R3 as signal C to a first negative input of a comparator K1. The second branch of the signal from point A is rectified through a diode D3 coupled with a capacitor C3 and is transmitted through a potentiometer P4 to arrive as signal P at a second, positive input of comparator K1.

Figure 3:
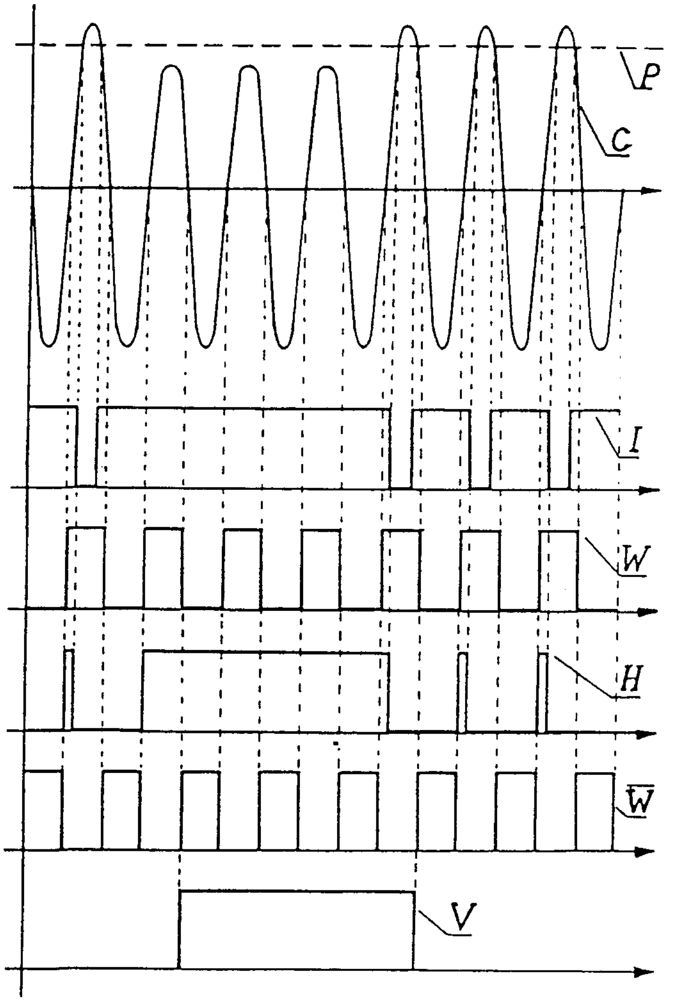
FIG. 3 is a series of voltage-time graphs for both embodiments.

The rectified signal P is shown by a horizontal, broken line in FIG. 3 setting a threshold which defines the forward break-over point of the comparator K1. The signal C applied to the negative input is compared to the voltage value of signal P at the positive input of K1, with the result that the comparator K1 yields a positive signal voltage I when the voltage value of signal C is lower than that of signal P and which shuts comparator K1 off when the voltage value of signal C is higher than that of signal P, as may be seen from the illustration of signal I in FIG. 3. The capacitor C3 is sufficiently large to hold the value of signal P at a relatively constant level when the amplitude of signal A is damped.

As shown in FIG. 1, the signal C is applied to a positive input of a second comparator K2 which has a grounded negative input. As soon as a positive signal input from signal C is applied to comparator K2, this comparator becomes transmissive and generates a signal W whose rectangular curve is shown in FIG. 3. The signal W is transmitted to a clock input CK of a first flip-flop D-FF1.

The data input D of flip-flop D-FF1 is supplied with a positive voltage of, for example, 5 volts. The output signal I of comparator K1 is wired to a priority clear input CLR of the flip-flop D-FF1. When the signal I is positive at the input CLR of flip-flop D-FF1, the leading edge of a pulse of signal W switches the output Q1 of flip-flop D-FF1 on, represented as signal H. The priority clear input CLR of flip-flop D-FF1 effects an immediate shutdown of the flip-flop as soon as the signal I changes to 0. This occurs independently of the signal W. The flip-flop is not turned back on until another leading edge of signal W is received.

The Q1 output of flip-flop D-FF1 is wired to a data input of a second flip-flop D-FF2. The second flip-flop eliminates the undesired pulses of the pulse train of signal H which are of brief-duration in comparison to the short-circuit signal from the key. This permits a desired signal V to be output from the Q2 output of the second flip-flop.

The signal W passes through an inverter and is then applied to the clock input of the second flip-flop D-FF2. The leading edges of the W signal define the points in time in which the H signal is interrogated by the second flip-flop D-FF2 and is transmitted to the output Q2 as the signal V. The brief-duration pulses of signal H do not appear since they lie exactly between the interrogation times. As seen in FIG. 3, what is achieved in this fashion is that the output signal V corresponds to the short-circuit times and that the brief-duration pulses that chronologically fall within the short-circuit are eliminated.

Thus, it is seen that the embodiment of the invention shown in FIG. 1 provides an output signal V which corresponds to a damped signal at the lock part 1 due to interaction with the key part 2. This is accomplished without the need for a second spaced coil at the lock part with its attendent problems. However, the embodiment shown in FIG. 1 does require that the potentiometer P4 be adjusted to set the level of signal P. Since all the components used in such a circuit are not absolutely identical in terms of their parameters, but rather are accurate within a range, the absolute level of the short-circuit signal and the differential of the short-circuit to the rectified signal are not identical in different circuits, therefore the potentiometer P4 must be manually adjusted in every circuit.

If there are later changes of the technical parameters of such a circuit which has been adjusted once during manufacture, then this must be readjusted during operational use. To overcome this disadvantage, the present invention also contemplates the circuitry shown in FIG. 2 which is a second embodiment of the present invention.

Figure 2:
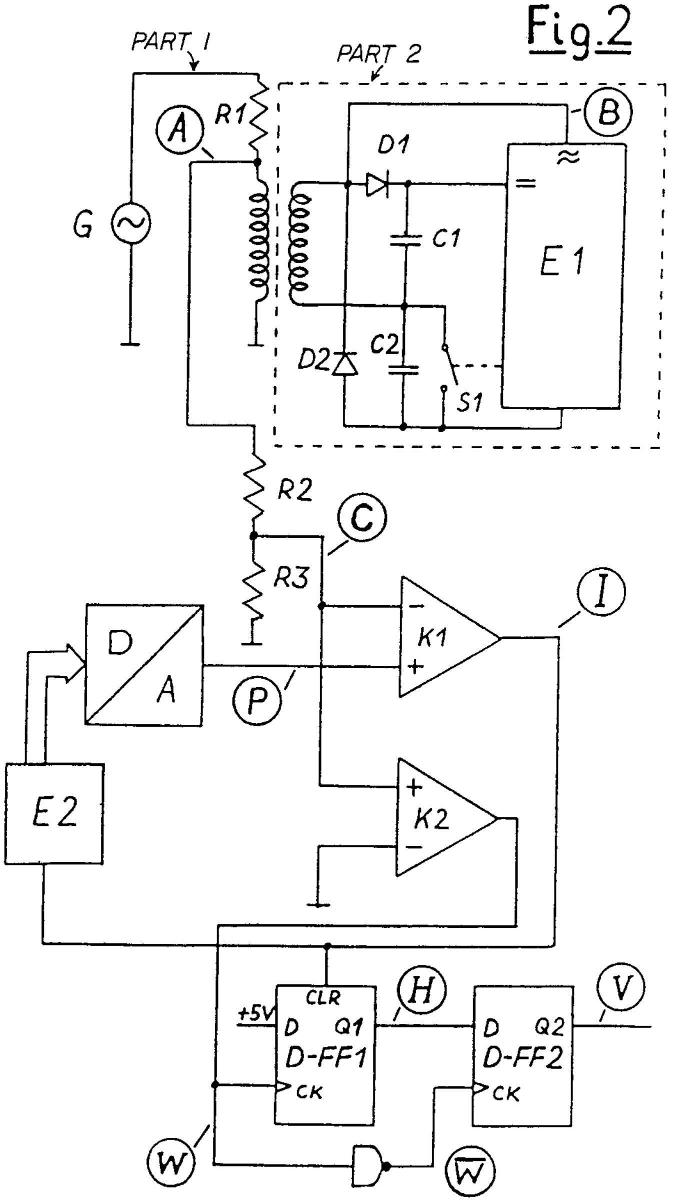
FIG. 2 is an electrical schematic diagram of an alternative embodiment of the present invention.

In FIG. 2, the output signal I from comparator K1 is transmitted through an electronics E2 to a digital to analog converter D/A to produce signal P which is transmitted to the positive input of comparator K1. The converter D/A first applies such high values to the positive input of the comparator K1 that the output I is always positive.

Figure 4:
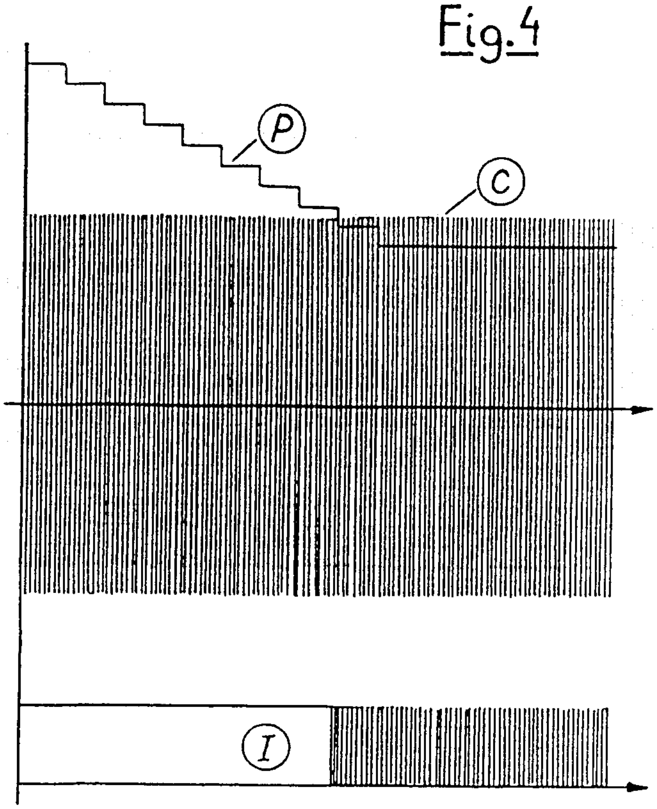
FIG. 4 is a series of voltage-time graphs for the alternative embodiment.

The step-wise change of the output value of the digital-to-analog converter D/A is shown in FIG. 4, as curve P. These output values of the converter D/A are reduced step-by-step until the value of signal P is below the peaks of signal C. This results in output pulses from comparator K1 as seen in curve I of FIG. 4. This status change of the signal I is interpreted by the electronics E2 and defines the number of further steps by which the output P of the digital-to-analog converter is further stepped down. The number of steps is precisely determined such that the d.c. voltage P lies in the region between the short-circuit peaks and the maximum peaks of the signals at the negative input of the comparator K1.

When exactly this voltage level is present at the negative output of the comparator K1, then the desired, unequivocal signal curve V for the short-circuit case is transmitted from the output of the second flip-flop D-FF2. Thus, an automatic, self-adjusting short-circuit detector has been provided.

A further advantage of the second embodiment is that there is no division of the signal A onto two paths in which the signal is conducted to the the two inputs of the comparator K1. In the second embodiment, the signal taken from the key part 2 is only conducted once via the voltage divider R2, R3 to the negative input of the comparator K1. The output of this comparator is supplied directly into the electronics E2 which then defines the level of the signal at the positive input of the comparator via the converter D/A. When, thus, the ratio of the voltage divider R2, R3 is changed, this circuit automatically follows the change.

The circuit of this invention also enables information to be communicated from the lock portion 1 to the key portion 2 by means of short-circuits of the lock coil, whereby the same signal recognition is produced at the key side as at the lock side.

Thus, it is seen that a circuit is provided utilizing simple, commercially available components which can be constructed relatively inexpensively. Further, the circuit is independent from signal changes at A, since these changes effect both branches of the input of the comparator K1 and, thus, a boost of the a.c. voltage input simultaneously produces a boost of the d.c. voltage input. The comparator produces the difference between the two signals and thus eliminates temperature influences and other disturbances.

As is apparent from the foregoing specification, the invention is susceptible of being embodied with various alterations and modifications which may differ particularly from those that have been described in the preceeding specification and description. It should be understood that I wish to embody within the scope of the patent warranted hereon all such modifications as reasonably and properly come within the scope of my contribution to the art.

I claim as my invention:

1. An electronic lock control device for use in lock-key system having a lock and a key for inductive coupling with said lock and thereby generating an encoded signal of damped and undamped signals, comprising:

means in said lock for generating a periodic signal;

coil means in said lock for transmitting said periodic signal; said coil means being selectively energetically coupled to said key to alternately damp and undamp said periodic signal means in said lock for comparing the amplitudes of said damped and undamped periodic signal comprising:

a first comparator means;

means for supplying one side of said comparator means with a first signal having an amplitude between the amplitude of said damped periodic signal and the amplitude of said undamped periodic signal;

means for supplying a second side of said comparator means with said damped and undamped periodic signal;

said comparator producing a periodic comparator signal during said undamped periodic signal and producing a continuous signal during said damped periodic signal; and means for removing said periodic comparator signal and retaining said continuous signal;

whereby a signal is produced only during said damped periodic signal.

2. A device according to claim 1 wherein said means for supplying one side of said comparator means with said first signal includes a rectifying means and a voltage divider means connected between said lock coil and said comparator means.

3. A device according to claim 1 wherein said means for supplying one side of said comparator means with said first signal comprises means for producing a self-adjusted signal, said self-adjusted signal producing means being supplied with a signal from said comparator means.

4. A device for detecting an encoded signal in an electronic lock, the encoded signal being generated by an electronic key inductively coupled to said electronic lock and being characterized by alternately damped and undamped periodic signals, comprising:

first and second branches, a first comparator having a non-inverting input and an inverting input connected to respective ones of said first and second branches, a rectifier connected in said first branchtto supply a selectively definable d.c. voltage thereto, a voltage divider in said second branch, a second comparator having inverting and non-inverting inputs, said non-inverting input of said second comparator being connected to said voltage divider, said inverting input of said second comparator being connected to a circuit ground, a first flip-flop having a clock input connected to an output of said second comparator and a clear input connected to an output of said first comparator, an inverter connected to an output of said second comparator, a second flip-flop having a clock input connected to said inverter and a data input connected to an output of said first flip-flop, whereby an output signal from said second flip-flop corresponds exactly to said encoded signal.

5. An electronic lock for use in a lock and key system having a key for energetic coupling with said lock transmit impedance changes, comprising:

a generator in said lock for producing a periodic signal;

a lock coil connected to said generator for transmitting said periodic signal and receiving said impedance changes;

a voltage divider connected to said lock coil;

means for producing a first signal;

a first comparator having a first input connected to said voltage divider and a second input connected to receive said first signal;

a second comparator having a first input connected to said voltage divider and a second input connected to a circuit ground;

a first flip-flop having a clear input connected to an output of said first comparator and a clock input connected to an output of said second comparator;

an inverter connected to said output of said second comparator;

a second flip-flop having a clock input connected to an output of said inverter and a data input connected to an output of said first flip-flop;

whereby an output signal of said second flip-flop corresponds to the impedance changes in said key.

6. A system as claimed in claim 5, wherein said first signal producing means includes:

a digital to analog converter having an output connected to a non-inverting input of said first comparator to supply a comparison voltage thereto;

means connected between said output of said first comparator and an input of said digital to analog converter for controlling said digital to analog converter to produce an output that is initially greater than a signal from said voltage divider such that said first comparator emits a constant positive signal, said controlling means including means for controlling said digital to analog converter to reduce its output in steps until said digital to analog converter signal is less than said signal from said voltage divider such that said first comparator emits a zero voltage output signal.

* * * * *